United States Patent [19]
Nelson et al.

[11] Patent Number: 5,927,328
[45] Date of Patent: Jul. 27, 1999

[54] SELF CLOSING FAUCET WITH TIMING MECHANISM

[75] Inventors: Alfred C. Nelson, Noblesville, Ind.; Stanley J. Brym, Torrington; Gunther H. Lumb, Collinsville, both of Conn.

[73] Assignee: Masco Corporation, Taylor, Mich.

[21] Appl. No.: 08/825,965

[22] Filed: Apr. 4, 1997

Related U.S. Application Data

[63] Continuation of application No. 08/721,288, Sep. 26, 1996, abandoned.

[51] Int. Cl.⁶ ............................................. F16K 31/48
[52] U.S. Cl. ......................... 137/624.12; 137/624.22; 251/74
[58] Field of Search ................. 137/624.12, 624.22, 137/624.11, 624.15, 624.13; 251/74

[56] References Cited

U.S. PATENT DOCUMENTS

| | | |
|---|---|---|
| 2,036,595 | 4/1936 | McDowell, Jr. . |
| 2,098,815 | 11/1937 | Van Veen . |
| 3,063,297 | 11/1962 | Hyde ............................ 137/624.11 X |
| 3,384,121 | 5/1968 | Spencer . |
| 3,638,682 | 2/1972 | Heyer et al. ..................... 137/624.12 |
| 3,807,451 | 4/1974 | Howlett . |
| 4,180,099 | 12/1979 | Moore ........................... 137/624.11 X |
| 4,270,574 | 6/1981 | Graber . |
| 4,335,852 | 6/1982 | Chow ............................. 137/624.12 X |
| 4,345,621 | 8/1982 | Dunckhorst . |
| 4,466,459 | 8/1984 | Higgins . |
| 4,653,534 | 3/1987 | Chung-Shan . |
| 5,078,178 | 1/1992 | Jang ................................ 137/624.12 |
| 5,404,910 | 4/1995 | Mongarli et al. ............... 137/624.22 X |

*Primary Examiner*—Kevin Lee
*Attorney, Agent, or Firm*—Reising, Ethington, Barnes, Kisselle, et al

[57] ABSTRACT

A faucet 10 includes a self closing faucet handle 16 having an escapement mechanism (77) in series with both a release ratchet (102) and a slip clutch (110) to provide ease in turning on the faucet and the option of a quick manual closing of the faucet valve. The ratchet (102), escapement mechanism (77) and slip clutch 110 are all concealed within the shell (42) of a blade handle (16) that is rotated between the on and off positions.

15 Claims, 4 Drawing Sheets

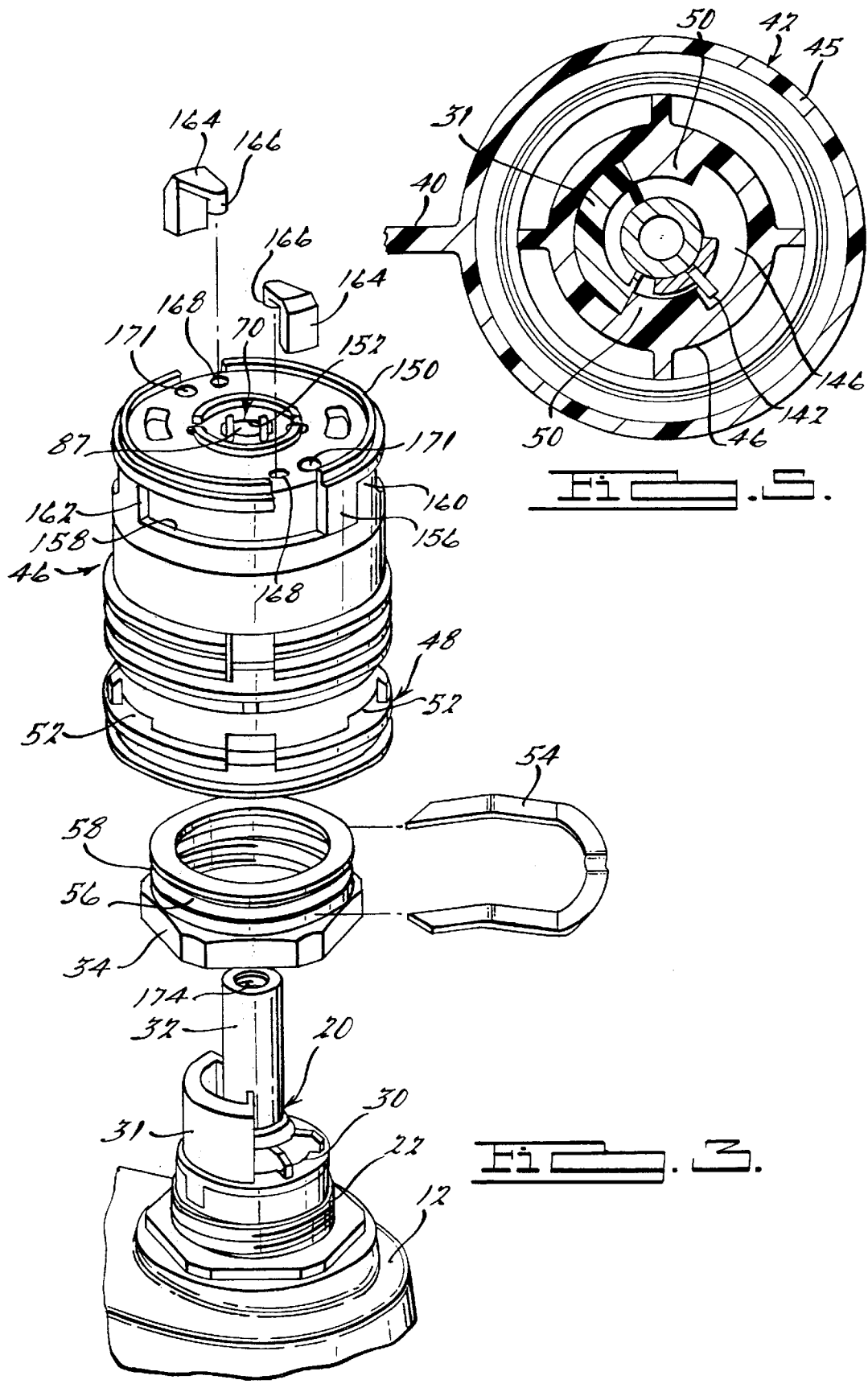

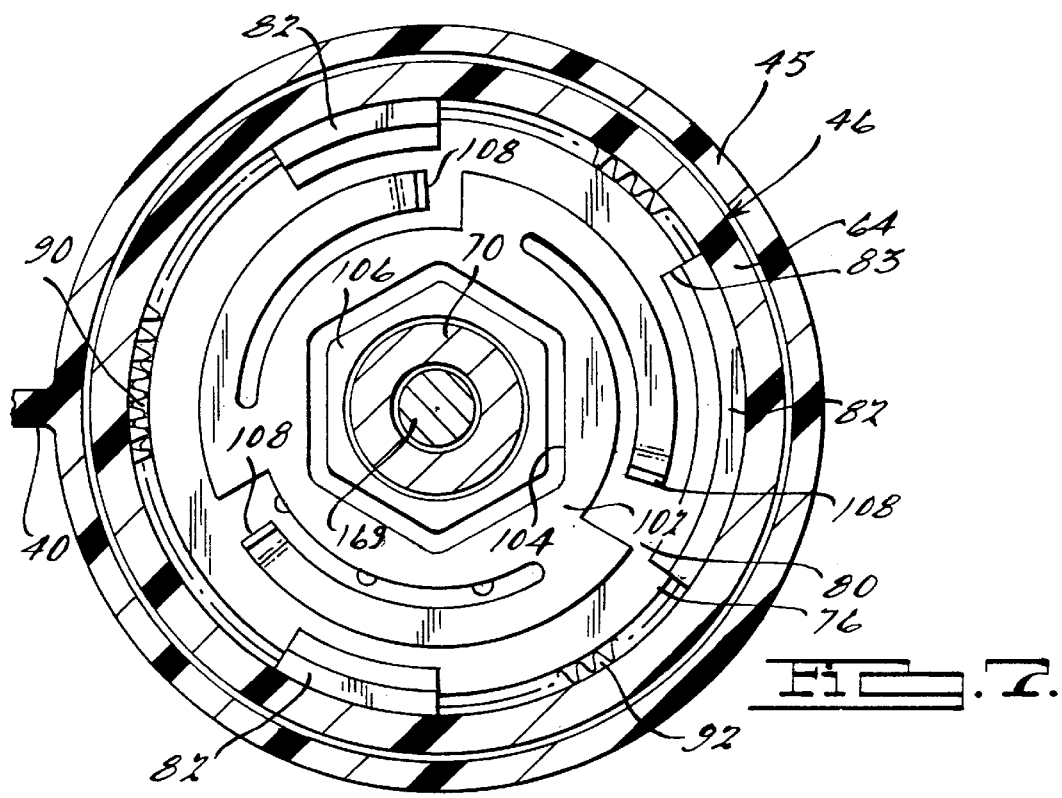
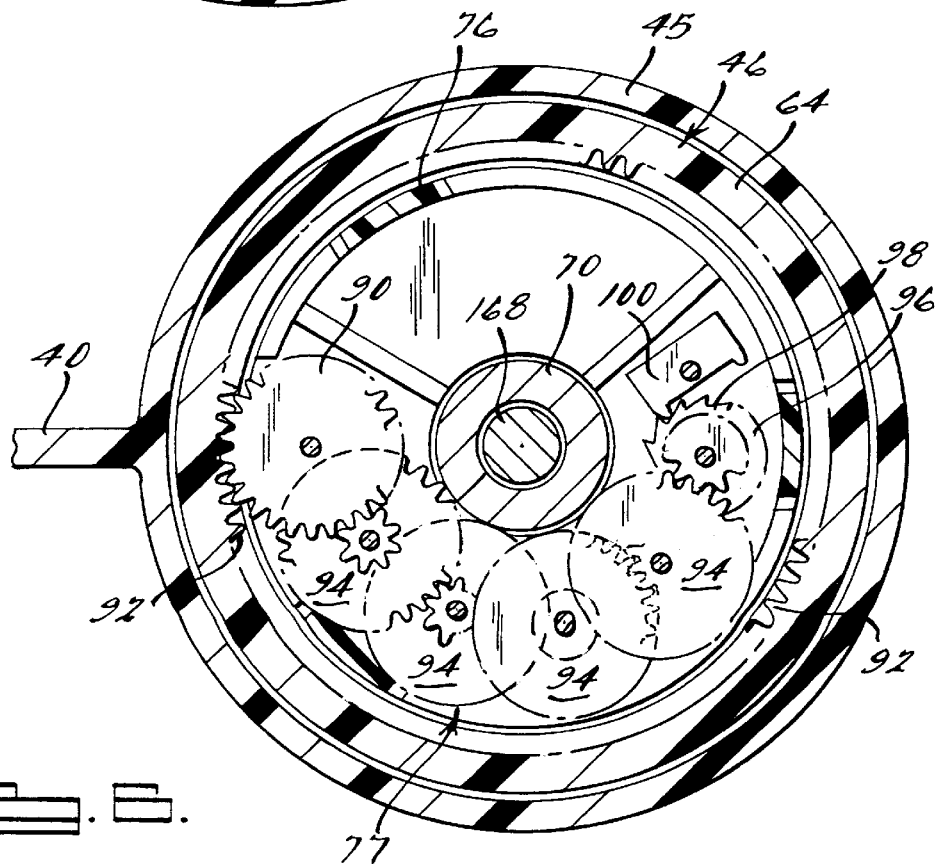

5,927,328

SELF CLOSING FAUCET WITH TIMING MECHANISM

This application is a continuation of application Ser. No. 08/721,288 filed on Sep. 26, 1996, now abandoned.

TECHNICAL FIELD

The field of this invention relates to a faucet having a timing mechanism which automatically shuts off the flow of water therethrough.

BACKGROUND OF THE DISCLOSURE

In recent years, water conservation has taken on increased importance. Many cities and states have passed ordinances dealing with water conservation. Some ordinances relate to the automatic shutting off of faucets that are in public lavatories.

Previous timing devices may have complicated mechanisms that add cost to the faucet valve. The added expense is caused by one spring mechanism for closing the faucet valve and a separate second spring mechanism for driving the escapement device that times the closing of the faucet.

Additional faucet standards have been developed to assure all people, including small children and people with physical disabilities, have full accessibility to public lavatories. One of these standards is directed to the ease of turning on a faucet. For ease of operation, a faucet needs a handle that is shaped to be easily manipulated and operated. Furthermore, the force needed to turn on the handle to the open or on position must not be more that five (5) pounds to assure that the most operators can easily open the faucet and have access to water.

However with many faucets, the manipulation required to open the faucet is different than the manipulation required to close the faucet; i.e., the open motion may be different and easier than the closing motion. For example with blade handles, the opening force may be a pushing motion that is much easier than the reverse pulling motion of the blade for closing the faucet.

A self closing faucet however alleviates the need for manually manipulating the faucet handle to a closed position. The most common way for providing a self closing faucet that incorporates a spring loaded timing mechanism that moves the handle to the closed position.

Previous efforts to simplify the timing mechanism produced handles that were difficult to manipulate and gearing mechanisms that were needlessly driven therefore having premature wear. Secondly, previous faucets could be stuck in an on or full flow position if there was failure of the gearing mechanism and it seized up.

What is needed is durable automatic faucet that is both easy to operate and provides for automatic shutting off of the water and an overriding manual closure capability.

SUMMARY OF THE DISCLOSURE

In accordance with one aspect of the invention, a faucet includes a fixed valve housing assembly having a generally cylindrical cavity. The housing includes a water inlet and water outlet. An arbor is connected to a valve element and a manually operable handle that forms an assembly that rotates with respect to the fixed valve housing between an open position and closed position. A spring is mounted between the valve housing and the arbor to exert a torsional force on the arbor toward the off position when the handle is in the open position.

An escapement mechanism includes a clutter mechanism and several gears being engaged to one another in a train and having an end gear of the train being engaged to a ring gear in the fixed valve housing. A friction clutch assembly and a ratchet device are operably interposed between the arbor and the fixed valve housing. The ratchet is constructed for providing rotational movement of the arbor with respect to the housing when the arbor is rotated toward its open position such that the gears in the escapement device are not operated. The friction clutch is constructed to provide sufficient adherence greater than the closing torque provided by the spring to allow the escapement mechanism to be engaged and retard the arbor and valve closing motion provided by the spring bias. However, the friction clutch allows slippage of the escapement mechanism with respect to the one of the fixed valve arbor upon additional manual closing torque being exerted upon the handle by an operator.

Preferably, the spring is in the form of a coil spring coaxially mounted about the arbor within the cavity of the housing. The spring has an outer end connected to the housing and an inner end connected to the arbor. The escapement mechanism preferably includes a case coaxially mounted about the arbor.

The ratchet is desirably affixed to the escapement case. The ratchet includes a plate mounted onto the escapement case for non-rotation therewith. The plate includes a plurality of circumferentially extending resiliently biased prongs or fingers having inclined ends which engage radially extending grooves in a bottom side of a disc that forms part of the friction clutch assembly.

In one embodiment, the handle has a cylindrical side wall downwardly extending to define a cavity. The escapement case, the coil spring, the friction disc and the valve housing all radially fit within and are concealed under the handle.

In accordance with another aspect of the invention, the above described escapement mechanism, ratchet, and friction clutch assembly are housed in a timer housing assembly that can be operably mounted to a faucet valve body. The rotatable arbor is affixable to a valve stem and a manually operable handle for rotating a valve element between an open position and closed position. The timer housing assembly has a bottom end constructed to be attachable to an upper end of a faucet valve body and allows a control stem of said faucet valve to extend into the fixed housing and be operably affixed to said rotatable arbor.

In accordance with another aspect of the invention, a self closing faucet valve includes a faucet body that has an open ended cylindrical valve chamber and a movable valve element rotatably mounted in said valve chamber for rotation between an open and closed position. A valve stop and cover member is positioned in an open end of said valve chamber of the faucet body and has a central bore for receiving a valve stem that is connected to said movable valve element. A cover nut is engaged to the faucet body and retains the valve stop and cover member at the end of the valve chamber.

A timer housing assembly has a generally cylindrical bore and is affixed onto the valve stop and cover member for correct rotational orientation. An arbor is rotatably connected to the fixed timer housing assembly. The arbor is also affixed to the valve stem for rotation therewith. A spring is mounted within the timer housing assembly and is connected to the timer housing assembly and the arbor such that it exerts a torsional force on the arbor toward the off position when the arbor is rotated to its open position.

An escapement mechanism is positioned within the timer housing assembly and has a first portion engaged to the timer housing assembly and a second portion operably engaged to the arbor. The escapement mechanism includes a clutter mechanism that controls closing rotation of the arbor with respect to the timer housing assembly. A ratchet device is positioned within the bore and is operably interposed between the arbor and the timer housing assembly. The ratchet is constructed for providing a release of the escapement mechanism from a respective one of the arbor and timer housing assembly when the arbor is manually rotated toward its open position such that the clutter mechanism in the escapement device is not operated during rotation of the arbor toward the open position. A handle has a top and at least one downwardly depending side wall extending to define a cavity with an open bottom such that the timer housing assembly is concealed within the cavity within the handle. The handle is affixed to the arbor and operable to rotate the arbor between the open and closed position.

In this fashion, a sturdy, simple and reliable faucet valve with a concealed self closing timing mechanism provides for automatic closure of the valve, optional manual closure of the valve, and easy low torque opening of the valve.

BRIEF DESCRIPTION OF THE DRAWINGS

Reference now is made to the accompanying drawings in which:

FIG. 3 is an exploded perspective view illustrating the mounting elements that mount the timer housing assembly to the faucet valve body;

FIG. 4 is an exploded perspective and partially segmented view of the internal parts of the timer housing assembly with the cover removed;

FIG. 5 is a cross-sectional view taken along line 5—5 in FIG. 2;

FIG. 6 is a cross-sectional view taken along line 6—6 in FIG. 2; and

FIG. 7 is a cross-sectional view taken along line 7—7 in FIG. 2.

DETAILED DESCRIPTION OF THE PREFERRED EMBODIMENT

Figure 1:
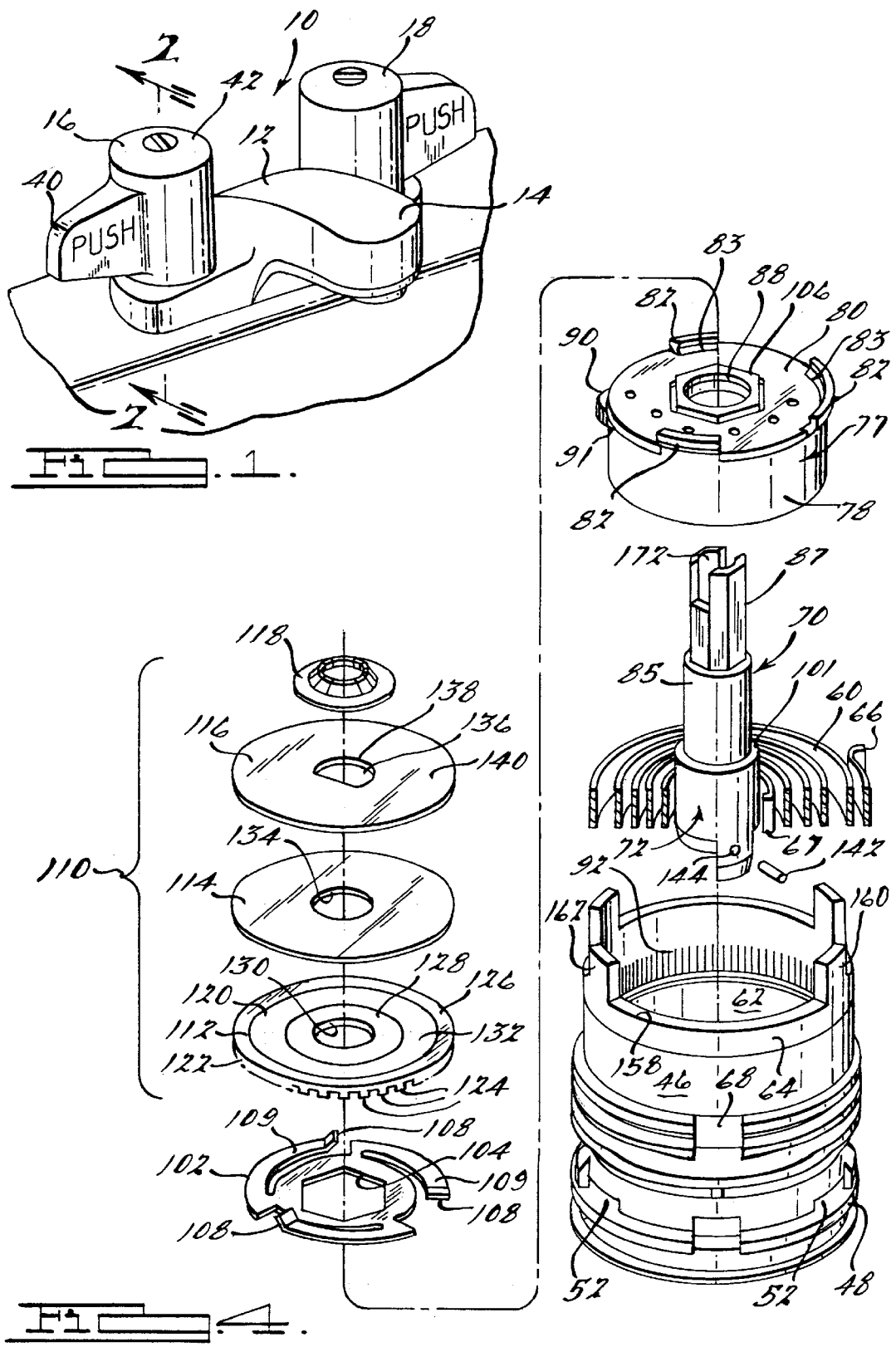
FIG. 1 is a perspective view of a two handle faucet of one embodiment of the instant invention.
Figure 2:
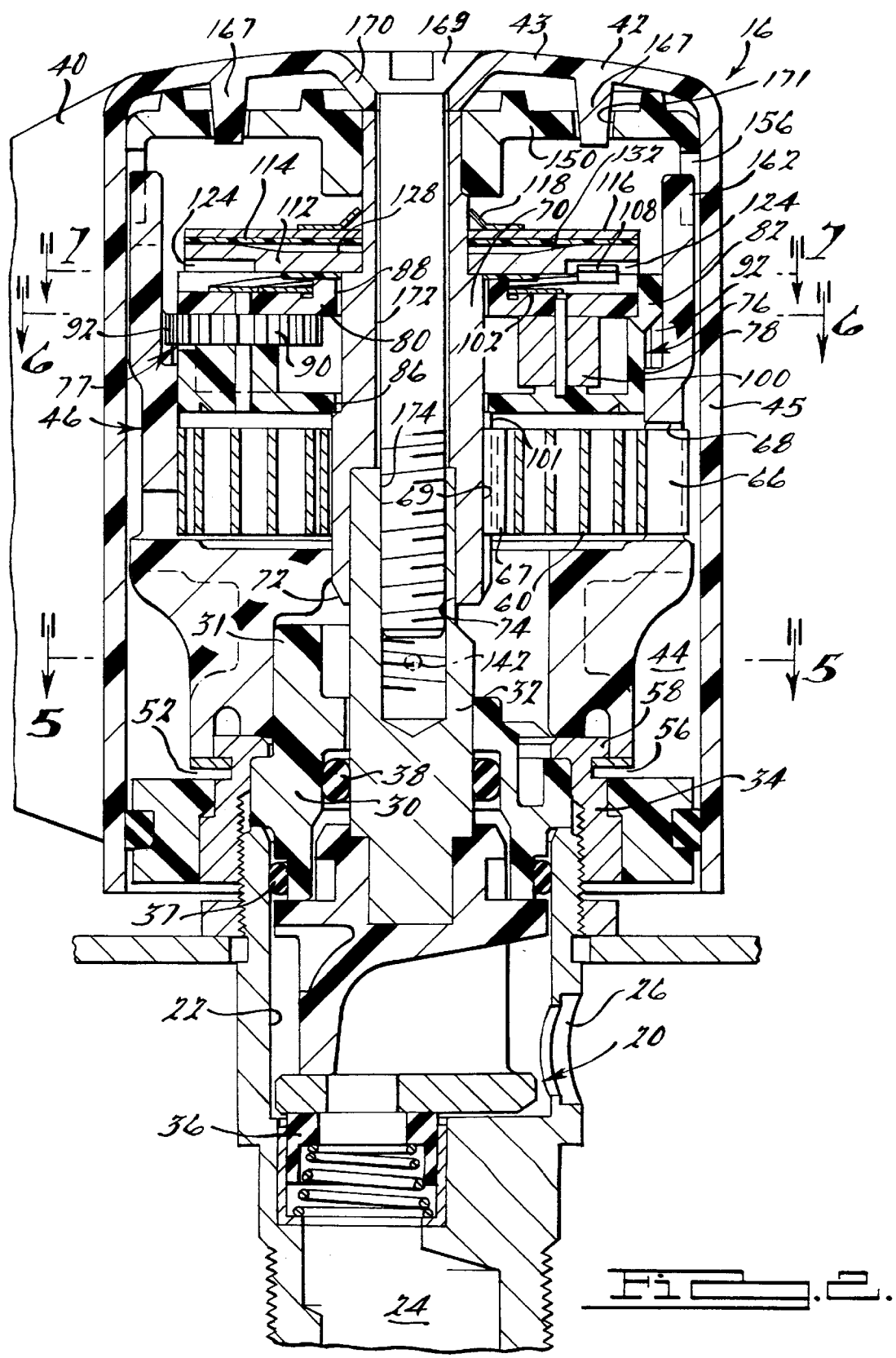
FIG. 2 is a cross-sectional view through the handle taken along line 2—2 in FIG. 1.

In the embodiment illustrated in FIGS. 1 and 2, a self closing faucet 10 includes a faucet body 12 with a spout 14, and a hot handle 16 and cold handle 18 mounted on the faucet body. The hot and cold handles 16 and 18 and the respective internal valve and timing mechanisms are substantially identical and hence only the hot side is illustrated in detail with the understanding that the cold side has the same or mirrored image structure.

As shown in FIG. 2, rotatable valve element 20 is conventionally mounted in valve chamber 22 of body 12 for rotation between a closed and open position for allowing and shutting off fluid flow from the inlet 24 to the outlet 26. The valve chamber 22 is conventionally closed at its upper end 28 as shown in FIGS. 2 and 3 with a valve stop and closure member 30. The closure member 30 has an upper extending portion 31. The valve element 20 is non-rotatably affixed to a control stem 32 that extends through the valve stop and cover member 30 also in a conventional fashion. A retaining nut 34 retains the valve stop and closure member 30 in place. Conventional seals 36, 37 and 38 seal off the valve chamber and prevent the faucet from leaking.

The handle 16 comprises a blade section 40 and a shell portion 42. Shell portion 42, as best illustrated in FIG. 2, is hollow with a top 43 and downwardly depending side wall 45 forming a cavity 44 open at its bottom and fits over and conceals a timer housing assembly 46. The timer housing assembly 46, as shown in FIGS. 2 and 3, has a bottom section 48 constructed to receive the upper extending portion 31 of stop 30 between its two inwardly extending shoulders 50 as shown in FIG. 5 to assure correct angular orientation of the housing assembly 46 on body 12. The bottom section 48 has two slots 52 therethrough that receive a bayonet spring clip 54 which also engages an external circumferential groove 56 in the retaining nut 34 and axially retained by the top flange 58 above the groove 56.

Reference now is made to FIGS. 2 and 4 where a coil spring 60 is disposed in a bore 62 in the upper portion 64 of timer housing 46. Outer end 66 of coil spring 60 is secured to the upper portion 64 within peripheral slot 68 of the housing 46, while inner end 67 of the spring 60 is anchored in slot 69 in an arbor shaft 72.

The lower end of arbor shaft 72 is non-rotatably affixed to the control stem 32. One common way to nonrotatably mount the arbor 70 is to have the control stem 32 have a D-shaped cross section and the lower end of the arbor having a complementary D-shaped receiving bore 74.

An escapement case 76 is disposed in the upper portion 64 of the housing 46 and about the arbor shaft 72. The escapement case 76 is comprised of a cylindrical wall section 78 and a top cover section 80. The top cover 80 is radially retained in position with respect to the wall 78 by a plurality of upwardly extending tabs 82 from the wall 78 engaging notches 83 in the top. The top tabs 82 extend radially outwardly which positions the case 76 coaxially within bore 62 of housing 46. Respective aligned central openings 86 and 88 are provided in case 76 and top cover 80 to rotatably receive a central section 85 of arbor shaft 72 such that the top section 87 of arbor 70 extends through and above the escapement case 76.

As best illustrated in FIGS. 2 and 6, disposed within the case 76 is the timer escapement mechanism 77 comprised of idler gear 90 rotatably mounted in the escapement case. The gear 90 extends through an aperture 91 in the side of the case 76 so that idler gear 90 engages and meshes with ring gear 92. The ring gear 92 is integrally formed in the upper section 64 of housing 46 about the central bore 62 that houses the case 76.

A series of pinion and wheel gears 94 are rotatably mounted in a series, i.e. in a train, within the housing 46 arcuately about the central opening 86. The other end of the series of gears has an escape wheel 96 with appropriately tapered teeth 98. The teeth 98 engage a clutter 100 that toggles back and forth to provide a controlled rotation of the gears as idler gear circumferentially travels about the ring gear 92 from torsional force exerted on the escapement casing as described later. Axially downward movement of escapement case 76 on arbor 70 is prevented by shoulder 101 on arbor 70 which has a greater diameter than opening 86 in the bottom of case 76 to prevent interference with the coil spring 60.

Referring now to FIGS. 2, 4 and 7, a ratchet 102 is disposed on top cover 80 of escapement case 76. As best shown in FIG. 4, the ratchet has a central polygonal shaped opening 104 that non-rotatably engages a complementary shaped embossment 106 about opening 88 in cover 80. Ratchet 102 is thus prevented from rotating independently of escapement case 76; i.e. ratchet 102 and housing 46 rotate together. Above ratchet 102 is disposed a friction or slip clutch assembly 110. The ratchet has upwardly canted spring biased distal teeth 108 at the end of resilient spring fingers 109 that upwardly extend to engage the slip clutch assembly 110 as described in more detail as follows.

The slip clutch assembly 110 includes a ratchet disc 112, friction disc 114, spring washer 116 and push nut clip 118. The ratchet disc 112 has a top surface 120 and a bottom toothed surface 122. The bottom toothed surface 122 has a plurality of grooves 124 that are constructed to receive the distal teeth 108 at the end of finger 109. The engagement cant of the teeth 108 with the grooves 124 is such that it allows as shown in FIG. 4 counterclockwise rotation of the ratchet 102 with respect to the ratchet disc 112 by allowing the teeth 108 to bias downwardly and exit grooves 124 but prevent clockwise rotation of the ratchet 102 with respect to the ratchet disc 112.

The top surface 120 has a flat radially outer annular shaped circumferential section 126 and a flat radially inner section 128 which is lower than section 126. A circular aperture 130 extends through the center of disc 112 to rotatably receive the upper section 87 of arbor 70. A canted intermediate section 132 joins sections 126 and 128.

Friction disc 114 is a flexible teflon layer of material with a central aperture 134 to allow the arbor section 87 to extend therethrough. Spring disc 116 has a central aperture 136 shaped to non-rotatably engage the upper section 87 of arbor 70 i.e. it always rotates with arbor 70. The push nut 118 is pushed downwardly onto the arbor section 87 to spring load the disc 116 by pushing the center section 138 about aperture 136 lower than its periphery 140 such that its provides an axially directed force onto the ratchet disc 112. The teflon layer 114 controls the slippage or the torsional force needed on the arbor 70 to cause the spring disc 116 to slip with respect to the ratchet disc 112.

For shipping purposes, a pin 142 extends into a side aperture 144 and as shown in phantom in FIGS. 2 and 5 radially extends into a cavity 146 in the lower section 48 of the housing below a flange 148 to prevent the arbor 70 and the retained escapement case 76, ratchet 102 and clutch assembly 110 from axially leaving the housing 46.

Referring back to FIGS. 2 and 3, the housing assembly 46 includes a rotatable cover member 150 that has a central mounting aperture 152 that non-rotatably sits on arbor section 87 to rotate therewith. The periphery 154 of the cover member 150 includes two downwardly depending flanges 156 that arcuately move in notch 158 at the upper end of the housing assembly 46 between off stop 160 and full on stop 162. The rotational stroke from full off to full on may be shortened by the addition of two removable inserts 164 that can abut the full on stop 162. The inserts 164 may be mounted by having a cylindrical depending peg 166 fitted into aperture 168 in cover 150.

The handle 16 has its shell section 42 fitted over the timer housing 46 and is correctly positioned by the insertion of two downwardly depending pins 167 fitted into apertures 171 in cover 150. A bolt 169 fits through central aperture 170 in the shell 42 and through central aperture 172 in arbor 70. The bolt 169 engages threaded aperture 174 in stem 32 to retain the handle assembly together.

In operation, the blade is pushed to rotate the handle in a clockwise rotation as illustrated. This motion turns the hot valve on. The clockwise rotation of handle 16 also winds the spring 60. The clockwise rotation of the arbor 70 also rotates the spring disc 116 and through friction provided through the teflon layer 14 rotates the ratchet disc 112. However, the ratchet 102 does not rotate because the teeth 108 are released from the grooves 124. Hence, the mechanism 77 in escapement case 76 remain inactive and the gears do not spin during the turning on of faucet handle 16.

Upon release of the handle 16 after it is rotated on, the torsional force of the wound spring 60 biases the arbor in the counterclockwise direction toward the off position. As the arbor turns, the spring disc turn therewith and through friction also turns the rachet disc 112 counterclockwise. The ratchet disc is locked with the ratchet 102 during the counterclockwise rotation due to the engagement with teeth 108. The ratchet through aperture 104 drives the entire escapement case 76 and sets the escapement mechanism 77 in action. The idler wheel 90 by being in engagement with ring gear 92 provides a slow counter-clockwise rotation of the arbor to the closed rotation through the well known action of the gears 94, release wheel 96 and clutter 100 of the escapement mechanism 77.

The span between the flange from abutting full on limit 162 to the time it abuts the off limit 160 can be set to approximately fifteen seconds. The inclusion of inserts 164 will shorten the time because of the shorter stroke to approximately ten seconds. Other time periods can be easily constructed by changing the gearing of the escapement mechanism 77 in the escapement case or by further lengthening or shortening the arc of rotation of the handle 16.

Normally, the escapement mechanism, driven by the force of spring 60 moves the faucet handle 16, arbor 70, and thus valve element 20 from the full on or open position to the full off or closed position by itself in the above described slow release through the escapement mechanism 77.

If one however wishes to close the faucet more quickly, one merely pulls on blade 40 to rotate the handle in the counterclockwise direction. The counter-clockwise torsional force exerted on the handle and thus the arbor will cause the clutch 110 to slip with disc 116 moving with respect to disc 112 thus unwinding the spring 60 and moving the handle, arbor and valve to the closed position without the escapement mechanism from fully functioning. The friction clutch 110 also provides a convenient backup function by allowing manual closing of the faucet valve in the event that the escapement mechanism 77 seizes or the spring 60 breaks while the faucet valve is in the on position.

The friction forces provided by the clutch 110 are greater than the torsional forces needed to release the ratchet teeth 108 from the disc 112 when the faucet is turned on. This allows the ratchet 102 to function and release the escapement mechanism from the arbor when the handle is moved to the on position. The friction forces provided by the clutch 110 are also higher than the closing torsional forces provided by the spring 60 which allows the escapement mechanism 77 to work through the clutch 110 and close the handle 16 without slippage while still allowing the option of slippage upon additional manual exerted torsional force on the handle to quickly turn off the faucet.

All the above functions are incorporated into a faucet that uses rotational motion to close and open the faucet. The entire timer housing assembly 46 with its components is concealed in a faucet blade handle that moves between a closed and on position in an innately intuitive fashion.

Variations and modifications are possible without departing from the scope and spirit of the present invention as defined by the appended claims.

The embodiments in which an exclusive property or privilege is claimed are defined as follows:

1. A self closing faucet valve characterized by:

a fixed housing assembly having a general cylindrical bore, said housing assembly having a water inlet and water outlet;

a rotatable arbor connected to a valve element and a manually operable handle, said valve element is rotatably movable by said handle between an open position and closed position in said fixed housing with respect to one of said inlet and outlet:

a spring mounted within said bore and operably between said valve housing and said arbor such that it exerts a torsional force on said arbor toward the off position when said arbor is rotated to said open position;

an escapement mechanism positioned within said bore and having a first gear being engaged to a ring gear in said fixed housing assembly and at least one more gear operably engaged to said first gear and a clutter mechanism for controlling rotation of said gears from said bias force of said spring on said arbor;

a friction clutch assembly and a ratchet being positioned within said bore and being operably interposed between said arbor and said fixed housing assembly;

said ratchet having pawls positioned and constructed for providing a release of said arbor with respect to said fixed housing assembly when said arbor is manually rotated toward said open position such that said gears in the escapement mechanism are not operated during rotation of said arbor toward the open position; and said friction clutch being constructed to provide an adherent static friction force greater than the closing torque force provided by said spring to maintain static engagement of said escapement mechanism with said arbor such that said escapement mechanism retards closing motion of the valve when said spring biases said valve and arbor toward said closed position;

and said escapement device allowed to slip with respect to one of fixed housing and said arbor upon additional manual closing torque being exerted upon said handle by an operator.

2. A faucet valve as defined in claim 1 further characterized by:

said spring being a coil spring coaxially mounted about said arbor within said bore and having an outer end connected to said housing and an inner end connected to said arbor;

said escapement mechanism includes a case coaxially mounted about said arbor;

said ratchet being affixed to said escapement case; and said friction clutch assembly being interposed between said arbor and said escapement case.

3. A faucet valve as defined in claim 2 further characterized by:

said ratchet includes a plate mounted onto said escapement case for non-rotation therewith;

said plate includes a plurality of circumferentially extending resiliently biased fingers having inclined ends which engage radially extending grooves in one side of a disc that forms part of said friction clutch assembly.

4. A faucet valve as defined in claim 3 further characterized by:

said handle having a cylindrical side wall downwardly extending to define a cavity such that said escapement case, said coil spring, said friction clutch assembly and said housing all fit within and are concealed within said cavity of said handle.

5. A faucet valve as defined in claim 4 further characterized by:

said arbor being non-rotatably affixed to a top cover plate that includes a first stop that abuts open and closed limit shoulders on said fixed housing assembly;

a removable second stop member being mountable on said cover plate for causing a shorter open stroke of said handle when said second stop member abuts said open limit shoulder.

6. A faucet valve timer closure assembly characterized by:

a housing having a central bore;

a rotatable arbor within said housing for movement between an open position and a closed position;

said arbor being affixable to a valve stem and a manually operable handle for moving said arbor and stem between an open position and closed position;

a spring mounted between said housing and said arbor that exerts a torsional force on said arbor toward the off position when said arbor is rotated to said open position;

an escapement mechanism having a clutter mechanism and several gears being engaged in a train to one another and having an end gear being engaged to a ring gear positioned in said bore of said fixed housing for rotating said escapement device with respect to said housing;

a friction clutch assembly and a ratchet being operably interposed between said arbor and said housing, said ratchet having bawls constructed and positioned for providing rotation of said arbor with respect to said housing device when said arbor is manually rotated toward its open position without operation of the escapement gears in the escapement device; and said friction clutch being constructed to provide an adherent static friction force greater than the closing torque force provided by said spring to maintain static engagement of said escapement mechanism with said arbor and said housing such that said escapement mechanism retards closing motion of the arbor when said spring biases said arbor toward said closed position and said escapement mechanism allowed to slip with respect to one of said arbor and housing upon additional closing torque being manually exerted upon said arbor by an operator.

7. A faucet valve timer closure assembly as defined in claim 6 further characterized by:

said housing assembly having a bottom end constructed to be attachable to an upper end of a faucet valve body and allowing a control stem of said faucet valve to extend into said fixed housing and be operably affixed to said rotatable arbor.

8. A faucet valve timer closure assembly as defined in claim 7 further characterized by:

said arbor having a top end constructed to be affixed to a handle having a cylindrical side wall downwardly extending to define a cavity;

said escapement mechanism, said coil spring, said friction clutch assembly and said housing being constructed to fit and be concealed within said cavity of said handle.

9. A faucet valve timer closure assembly as defined in claim 7 further characterized by:

said spring being a coil spring coaxially mounted about said arbor within said bore and having an outer end connected to said housing and an inner end connected to said arbor;

said escapement mechanism includes a case coaxially mounted about said arbor;

said ratchet affixed to said escapement case; and said friction clutch assembly being interposed between said arbor and said escapement case.

10. A faucet valve timer closure assembly as defined in claim 9 further characterized by:

said ratchet includes a plate mounted onto said escapement case for non-rotation therewith;

said plate includes a plurality of circumferentially extending resiliently biased fingers having inclined ends which engage radially extending grooves in one side of a disc that forms part of said friction clutch assembly.

11. A faucet valve timer closure assembly as defined in claim 10 further characterized by:

said arbor being non-rotatably affixed to a top cover plate that includes a first stop that abuts open and closed limit shoulders on said housing;

a removable second stop member being mountable on said cover plate for causing a shorter open stroke of said arbor when said second stop member abuts said open limit shoulder on said housing.

12. A self closing faucet valve characterized by:

a faucet valve body including an open ended cylindrical valve chamber and a movable valve element rotatably mounted in said valve chamber for rotation between an open and closed position;

a valve stop and cover member positioned in an open end of said valve chamber and having a central bore for receiving a valve stem that is connected to said movable valve element;

a cover nut engaging said faucet valve body and retaining said valve stop and cover member at said end of said valve chamber;

a timer housing assembly having a generally cylindrical bore affixed onto said valve stop and cover member;

an arbor affixed to said valve stem for rotation therewith and rotatably connected to said timer housing assembly;

a spring mounted within said timer housing assembly and operably positioned between said timer housing assembly and said arbor such that it exerts a torsional force on said arbor toward the off position when said arbor is rotated to said open position;

an escapement mechanism positioned within said timer housing assembly and having a first portion operably connected to said timer housing assembly and a second portion operably connected to said arbor and having a clutter mechanism for controlling closing rotation of said arbor with respect to said timer housing assembly;

a ratchet being positioned within said bore and being operably interposed between said arbor and said timer housing assembly;

said ratchet having pawls constructed and positioned for providing a release of said escapement mechanism from a respective one of said arbor and timer housing assembly when said arbor is manually rotated toward said open position such that the escapement mechanism is not operated during rotation of said arbor toward the open position;

a handle having a top and at least one downwardly depending side wall extending to define a cavity such that said timer housing assembly is concealed within said cavity within said handle; and said handle being affixed to said arbor and operable to rotate said arbor between an open position and closed position.

13. A self closing faucet as defined in claim 12 further characterized by:

a friction clutch assembly being positioned within said timer housing assembly and being operably interposed between said arbor and said timer housing assembly;

said friction clutch being constructed to provide an adherent static friction force greater than the closing torque force provided by said spring to maintain static engagement of said escapement mechanism to be engaged with one of said arbor and said housing assembly such that said escapement mechanism retards closing motion of the valve when said spring biases said valve and arbor toward said closed position; said escapement device allowed to slip with respect to said friction clutch upon additional manual closing torque being exerted upon said handle by an operator.

14. A self closing faucet as defined in claim 12 further characterized by:

said timer housing assembly retained onto said valve stop and cover member by a clip which passes through a slot in a bottom section of said timer housing assembly and also engages a slot in said cover nut.

15. A self closing faucet as defined in claim 12 further characterized by:

said arbor being non-rotatably affixed to a top cover plate that includes a first stop that abuts open and closed limit shoulders on said housing;

a removable second stop member being mountable on said cover plate for causing a shorter open stroke of said handle when said second stop member abuts said open limit shoulder on said housing.

* * * * *

UNITED STATES PATENT AND TRADEMARK OFFICE
CERTIFICATE OF CORRECTION

PATENT NO : 5,927,328
DATED : July 27, 1999
INVENTOR(S): Alfred C. Nelson et al.

It is certified that error appears in the above-identified patent and that said Letters Patent are hereby corrected as shown below:

Column 8, line 32, after "having" delete [bawls] and insert --pawls--.

Signed and Sealed this

Twenty-second Day of May, 2001

Attest:

NICHOLAS P. GODICI

*Attesting Officer*    *Acting Director of the United States Patent and Trademark Office*